United States Patent
Fasola et al.

(10) Patent No.: US 10,458,810 B2
(45) Date of Patent: Oct. 29, 2019

(54) TRAFFIC LIGHT STATE ASSESSMENT

(71) Applicant: GM GLOBAL TECHNOLOGY OPERATIONS LLC, Detroit, MI (US)

(72) Inventors: Juan Fasola, San Francisco, CA (US); Tristan Zier, San Francisco, CA (US); Thomas Gellatly, Oakland, CA (US); Varadharajan Ponnappan, San Jose, CA (US); Matthias Wisniowski, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 81 days.

(21) Appl. No.: 15/851,153

(22) Filed: Dec. 21, 2017

(65) Prior Publication Data

US 2018/0112997 A1 Apr. 26, 2018

(51) Int. Cl.
| | |
|---|---|
| G01C 21/36 | (2006.01) |
| G06K 9/00 | (2006.01) |
| G01C 21/34 | (2006.01) |
| G05D 1/00 | (2006.01) |
| G08G 1/0967 | (2006.01) |
| B60W 30/18 | (2012.01) |
| G08G 1/0962 | (2006.01) |
| G06K 9/32 | (2006.01) |
| G05D 1/02 | (2006.01) |

(52) U.S. Cl.
CPC ... *G01C 21/3691* (2013.01); *B60W 30/18154* (2013.01); *G01C 21/3407* (2013.01); *G05D 1/0088* (2013.01); *G05D 1/0246* (2013.01); *G05D 1/0274* (2013.01); *G06K 9/00825* (2013.01); *G06K 9/3233* (2013.01); *G08G 1/09623* (2013.01); *G08G 1/09626* (2013.01); *G08G 1/096725* (2013.01); *G08G 1/096775* (2013.01); *B60W 2550/402* (2013.01); *G05D 2201/0213* (2013.01); *G06K 9/00798* (2013.01)

(58) Field of Classification Search
CPC ........... G01C 21/3691; G01C 21/3407; B60W 30/18154; B60W 2550/402; G05D 1/0088; G05D 1/0246; G05D 1/0274; G05D 2201/0213; G06K 9/0274; G06K 9/00825; G06K 9/3233; G06K 9/00798; G08G 1/09623; G08G 1/09626; G08G 1/096725; G08G 1/096775
USPC .......................................................... 701/25
See application file for complete search history.

(56) References Cited

U.S. PATENT DOCUMENTS 9,916,703 B2 * 3/2018 Levinson ............... G01S 15/931
10,019,011 B1 * 7/2018 Green ............... B60W 30/0956

* cited by examiner

Primary Examiner — Gertrude Arthur Jeanglaude
(74) Attorney, Agent, or Firm — Lorenz & Kopf, LLP

(57) ABSTRACT

Systems and method are provided for controlling a vehicle. In one embodiment, a method includes: receiving semantic map data, via a processor, wherein the semantic map data includes traffic light location data, calculating route data using the semantic map data, via a processor; viewing, via a sensing device, a traffic light and assessing a state of the viewed traffic light, via a processor, based on the traffic light location data, and controlling driving of an autonomous vehicle based at least on the route data and the state of the traffic light, via a processor.

17 Claims, 7 Drawing Sheets

TRAFFIC LIGHT STATE ASSESSMENT

INTRODUCTION

The present disclosure generally relates to autonomous vehicles, and more particularly relates to systems and methods for autonomous driving.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Autonomous vehicles may sense and assess a state of traffic lights at intersections and take appropriate vehicle control action depending upon the traffic light state. However, it can be computationally intensive to look for each traffic light at each intersection and infer which path of travel the traffic light represents amongst a plurality of possibilities. Further, it is important to accurately identify a relevant traffic light.

Accordingly, it is desirable to provide systems and methods that view and assess the state of a relevant traffic light at each intersection along a route with enhanced computing efficiency and/or accuracy. Furthermore, other desirable features and characteristics of the present disclosure will become apparent from the subsequent detailed description and the appended claims, taken in conjunction with the accompanying drawings and the foregoing technical field and background.

SUMMARY

Systems and methods are provided for controlling a vehicle.

In one embodiment, an autonomous driving system, includes a guidance system configured to receive semantic map data and to calculate route data using the semantic map data, via a processor. The semantic map data includes traffic light location data. A computer vision system is configured to view and assess a state of a traffic light based on the traffic light location data, via a processor. A vehicle control system is configured to control driving of an autonomous vehicle based at least on the route data and the state of the traffic light, via a processor.

In embodiments, the route data includes a labelled intersection lane and the traffic light location data is associated with the labelled intersection lane.

In embodiments, the semantic map maps an intersection using a plurality of labelled intersection lanes defining paths for traversing the intersection. Each labelled intersection lane includes a traffic light label defining traffic light location data. Traffic light labels of at least some of the labelled intersection lanes identify different traffic lights from each other.

In embodiments, the semantic map includes a labelled lane entering an intersection and at least first and second labelled lanes exiting the intersection. A first labelled intersection lane defines a path connecting the labelled lane entering the intersection and the first labelled lane exiting the intersection and a second labelled intersection lane defines a path connecting the labeled lane entering the intersection and the second labelled lane exiting the intersection. Different traffic light labels are associated with the first and second labelled intersection lanes, respectively, identifying different traffic lights and defining different traffic light location data.

In embodiments, the semantic map includes labelled lanes entering and exiting an intersection, labelled intersection lanes defining paths connecting labelled lanes entering the intersection and labelled lanes exiting the intersection, labelled anchor points where lanes enter the intersection and labelled traffic lights, wherein each labelled anchor point is linked to a labelled traffic light, wherein each labelled intersection lane is associated with a labelled traffic light.

In embodiments, the semantic map includes traffic light identifiers, traffic light type data, intersection lane identifiers, identifiers for lanes entering the intersection and/or identifiers for lanes exiting the intersection.

In embodiments, the route data includes lane identifiers identifying lanes to be used along the route and intersection lane identifiers identifying intersection lanes to be used along the route.

In embodiments, the system includes a data storage device storing the semantic map in the autonomous vehicle.

In embodiments, the traffic light location data defines a location of the traffic light in three spatial dimensions including height. In embodiments, the traffic light location data includes orientation of the traffic light. In embodiments, the traffic light location data includes six degrees of freedom position information. In embodiments, the traffic light location data includes estimates for x, y and z coordinates as well as roll, pitch and yaw.

In embodiments, the computer vision system is configured to control a field of view of a sensing device based on the traffic light location data and/or select a portion of imaging data obtained by at least one sensing device that contains the traffic light based on the traffic light location data, whereby the computer vision system is configured to assess the state of the traffic light by focusing, e.g. focusing image processing, on the traffic light in the selected portion of imaging data.

In embodiments, the computer vision system is configured to receive visual data of the traffic light from a sensing device and is configured to assess a state of the traffic light including a stop and go state. The vehicle control system is configured to control the autonomous vehicle to commence going, to continue going or to stop before the traffic light depending upon the state of the traffic light.

In embodiments, the system includes a positioning system configured to determine position data representing a current position of the autonomous vehicle.

In embodiments, the computer vision system is configured to visualize an upcoming traffic light based on the position data which identifies a position of the vehicle relative to the semantic map, the route data which identifies the upcoming traffic light and the traffic light location data associated with an intersection lane being followed according to the route data. In embodiments, the computer vision system commences visualizing and assessing the state of the traffic light based on geometric (e.g. line of sight) calculations, the positioning data and the traffic light location data determining when the traffic light is first able to visualized or based on a data label in the semantic map identifying where the traffic light is first able to be visualized or based on being within a predetermined distance of the traffic light as determinable from the positioning data and the traffic light location data.

In embodiments, the computer vision system is configured to view the traffic light and/or concentrate image processing on the traffic light based on the current position of the vehicle and the traffic light location data.

In another embodiment, a computer implemented method of autonomous driving includes receiving semantic map data, via a processor. The semantic map data includes traffic light location data. The method includes calculating route data using the semantic map data, via a processor. The method includes viewing, via at least one sensing device, a traffic light and assessing a state of the viewed traffic light, via at least one processor, based on the traffic light location data. The method includes controlling driving of an autonomous vehicle based at least on the route data and the state of the traffic light, via a processor.

In embodiments, the semantic map includes a labelled lane entering an intersection and at least first and second labelled lanes exiting the intersection. A first labelled intersection lane defines a path connecting the labelled lane entering the intersection and the first labelled lane exiting the intersection and a second labelled intersection lane defines a path connecting the labeled lane entering the intersection and the second labelled lane exiting the intersection. Different traffic light labels are associated with the first and second labelled intersection lanes, respectively, which identify different traffic lights and define different traffic light location data.

In embodiments, the traffic light location data defines a location of the traffic light in three spatial dimensions including height. In embodiments, the traffic light location data includes six degrees of freedom position information. In embodiments, the traffic light location data includes estimates for x, y and z coordinates as well as roll, pitch and yaw.

In embodiments, the method includes controlling a field of view of a sensing device based on the traffic light location data and/or selecting a portion of imaging data obtained by at least one sensing device that contains the traffic light, whereby the computer vision system is configured to assess the state of the traffic light by focusing on the traffic light in the selected portion of imaging data.

In embodiments, the method includes tracking a location of the autonomous vehicle in the semantic map based on current position data for the autonomous vehicle, extracting traffic light location data from an upcoming labelled intersection lane in the semantic map that is to be followed according to the route data, and configuring the sensing device to view the traffic light based on the extracted traffic light location data.

In one embodiment, an autonomous vehicle includes a data storage device storing a semantic map, a guidance system configured to receive semantic map data from the semantic map and configured to calculate route data using the semantic map data, via a processor. The semantic map data includes traffic light location data. A computer vision system is configured to view and assess a state of a traffic light based on the traffic light location data, via a processor. A vehicle control system is configured to control driving of the autonomous vehicle based at least on the route data and the state of the traffic light, via a processor.

In embodiments, the semantic map includes a labelled lane entering an intersection and at least first and second labelled lanes exiting the intersection. A first labelled intersection lane defines a path connecting the labelled lane entering the intersection and the first labelled lane exiting the intersection and a second labelled intersection lane defines a path connecting the labeled lane entering the intersection and the second labelled lane exiting the intersection. Different traffic light labels are associated with the first and second labelled intersection lanes, respectively, identify different traffic lights and define different traffic light location data.

In embodiments, a positioning system is configured to determine current position data for the autonomous vehicle and configured to track a location of the autonomous vehicle in the semantic map based on the current position data for the autonomous vehicle. The computer vision system is configured to extract traffic light location data from an upcoming labelled intersection lane in the semantic map that is to be followed according to the route data. The computer vision system is further for configuring the sensing device to view the traffic light and/or focusing image processing on the traffic light based on the extracted traffic light location data.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
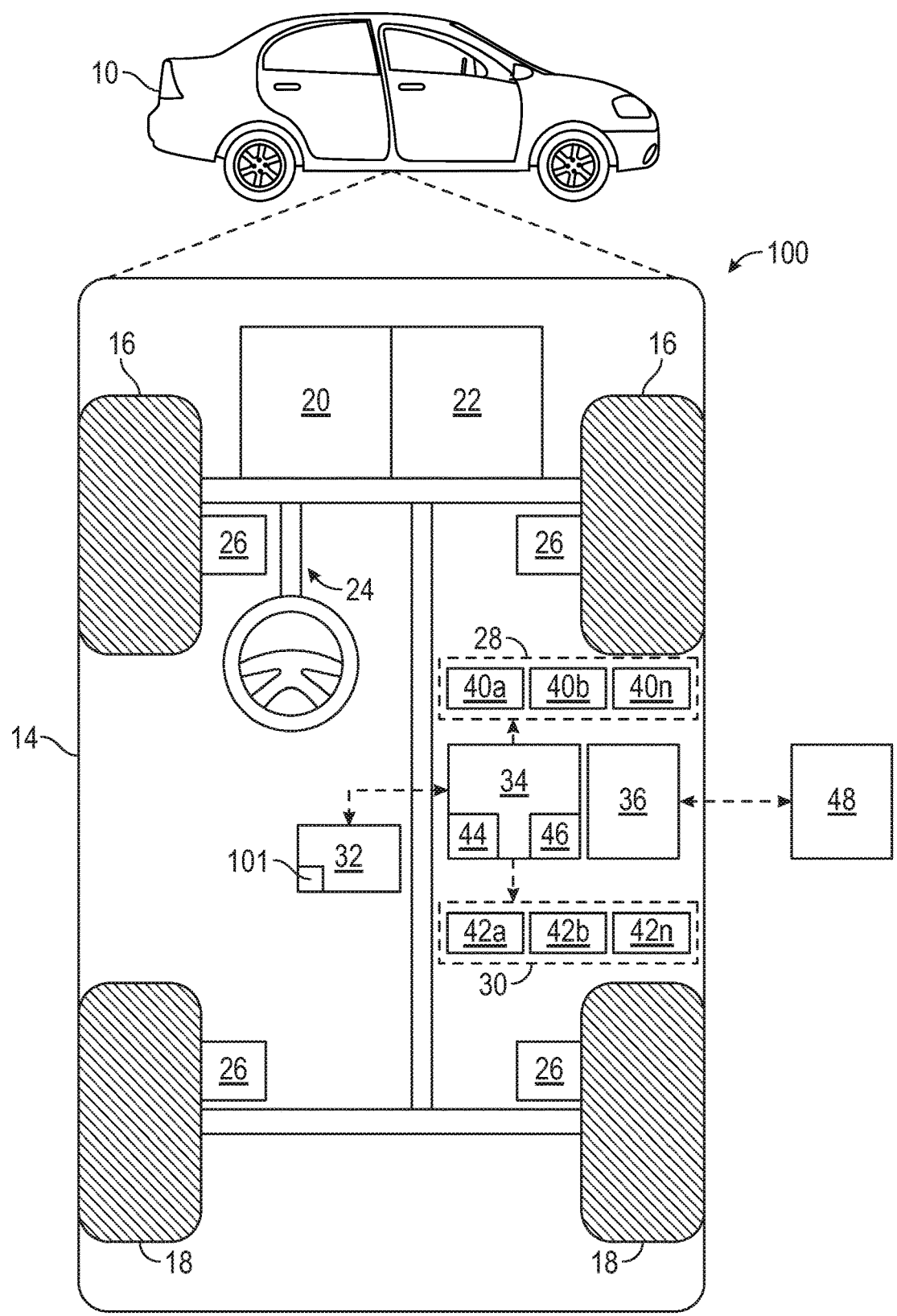
FIG. 1 is a functional block diagram illustrating an autonomous vehicle, in accordance with various embodiments.

With reference to FIG. 1, a system shown generally at 100 is associated with a vehicle 10 in accordance with various embodiments. In general, the system 100 uses traffic light data stored in a semantic map and intelligently controls the vehicle 10 based thereon.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras 40a, thermal cameras, ultrasonic sensors, inertial measurement units, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
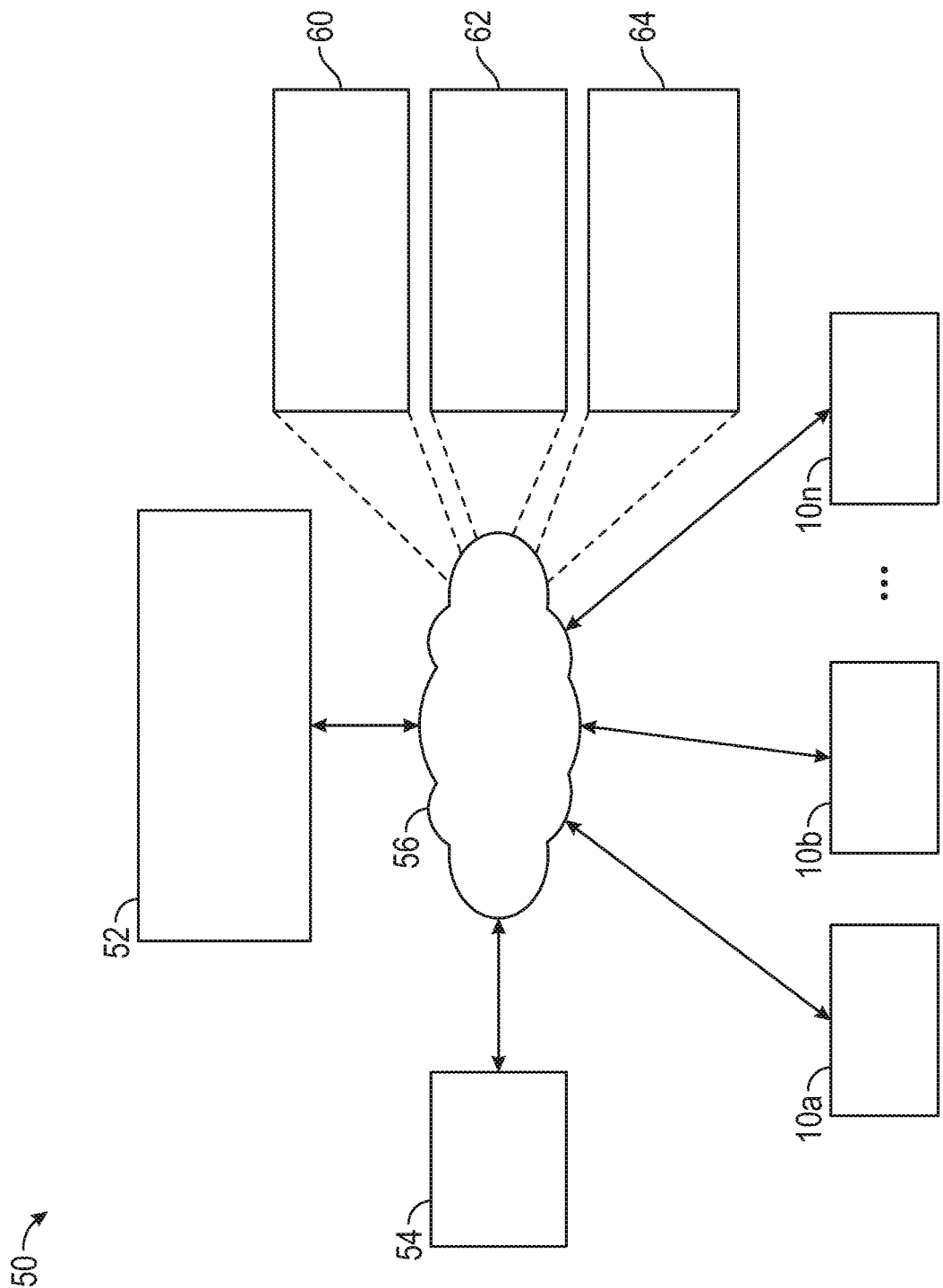
FIG. 2 is a functional block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps 100 of the navigable environment. In various embodiments, the defined maps 100 may be predefined by and obtained from a remote system (described in further detail with regard to FIG. 2). For example, the defined maps 100 may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

In embodiments, the map 101 is a semantic map 101 created from a set of labeled (e.g. human labelled) LiDAR maps. That is, mapping vehicles first obtain point cloud or LiDAR maps and the semantic map 101 is derived from the LiDAR maps. In one example, the semantic map 101 is encoded with detailed information like driveable areas, lane types, route possibilities through intersections (intersection lanes), traffic light location data, traffic light type data and pedestrian walkways, and is maintained in a Postgres data-base on the vehicle 10. The semantic map 101 includes a two-dimensional map that is comprised of labels, where the labels have been made based on obtained LiDAR data, with information such as drivable areas, possible routes through intersections, and traffic light data (including traffic light location and type data) added to the two-dimensional map through semantic layers. Labeling is, in some embodiments, performed through a mix of automated processes and human manual annotation.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the system 100 and, when executed by the processor 44, retrieve traffic light location data from the semantic map (or maps) 100, directs image processing of images obtained by at least one visual sensing device 40a based on the traffic light location data, assesses a state of the traffic light and controls the vehicle 10 according to the state of the traffic light.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
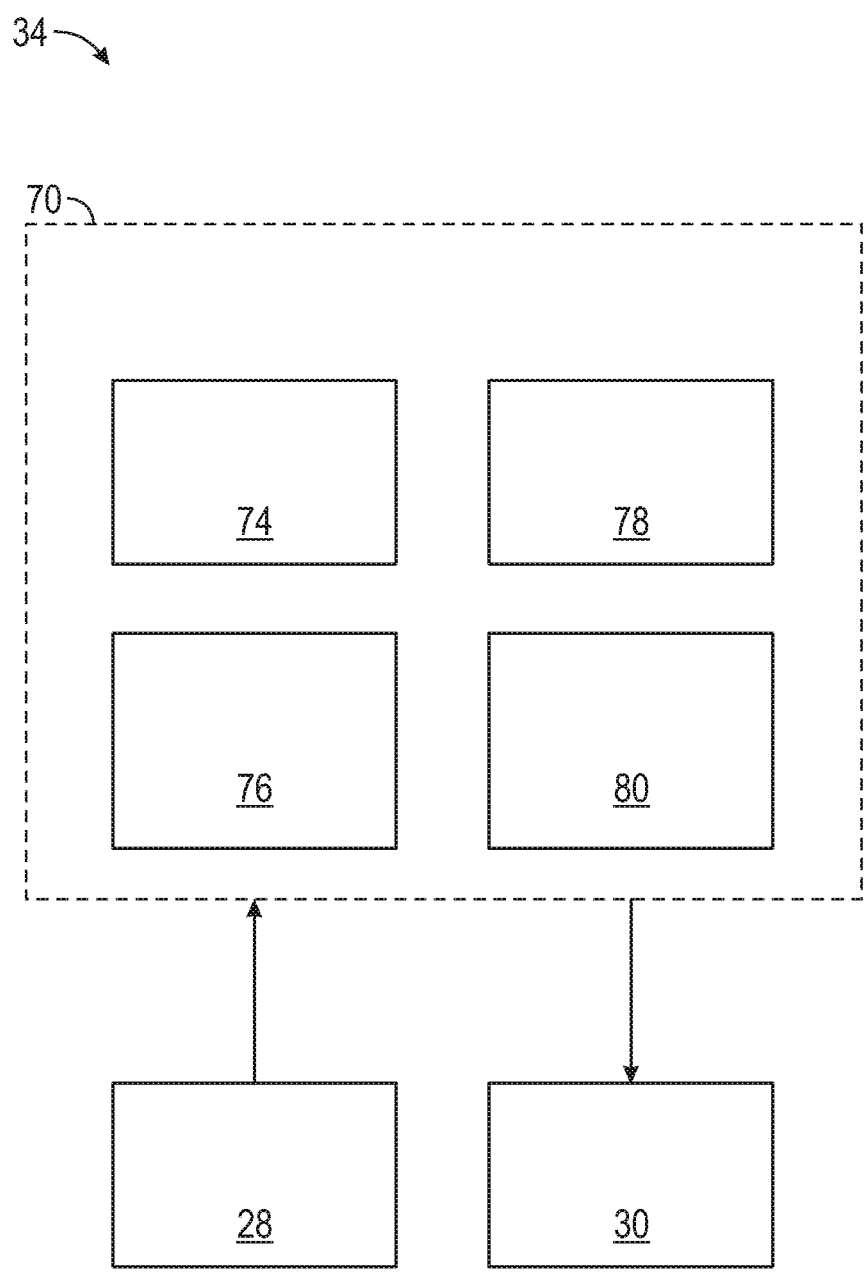
FIGS. 3 and 4 are dataflow diagrams illustrating an autonomous driving system, in accordance with various embodiments.

In accordance with various embodiments, the controller 34 implements an autonomous driving system (ADS) 70 as shown in FIG. 3. That is, suitable software and/or hardware components of the controller 34 (e.g., the processor 44 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the system 100 of FIG. 1 is included within the ADS 70, for example, as will be described in the following. Generally, the autonomous driving system is configured to retrieve traffic light location data from the semantic map 101, the computer vision system 74 is configured to direct image processing of images obtained by the at least one sensing device 40a based on the traffic light location data, to assess a state of an associated traffic light, and the vehicle control system 80 is configured to control the vehicle 10 based on the state of the traffic light.

Figure 4:
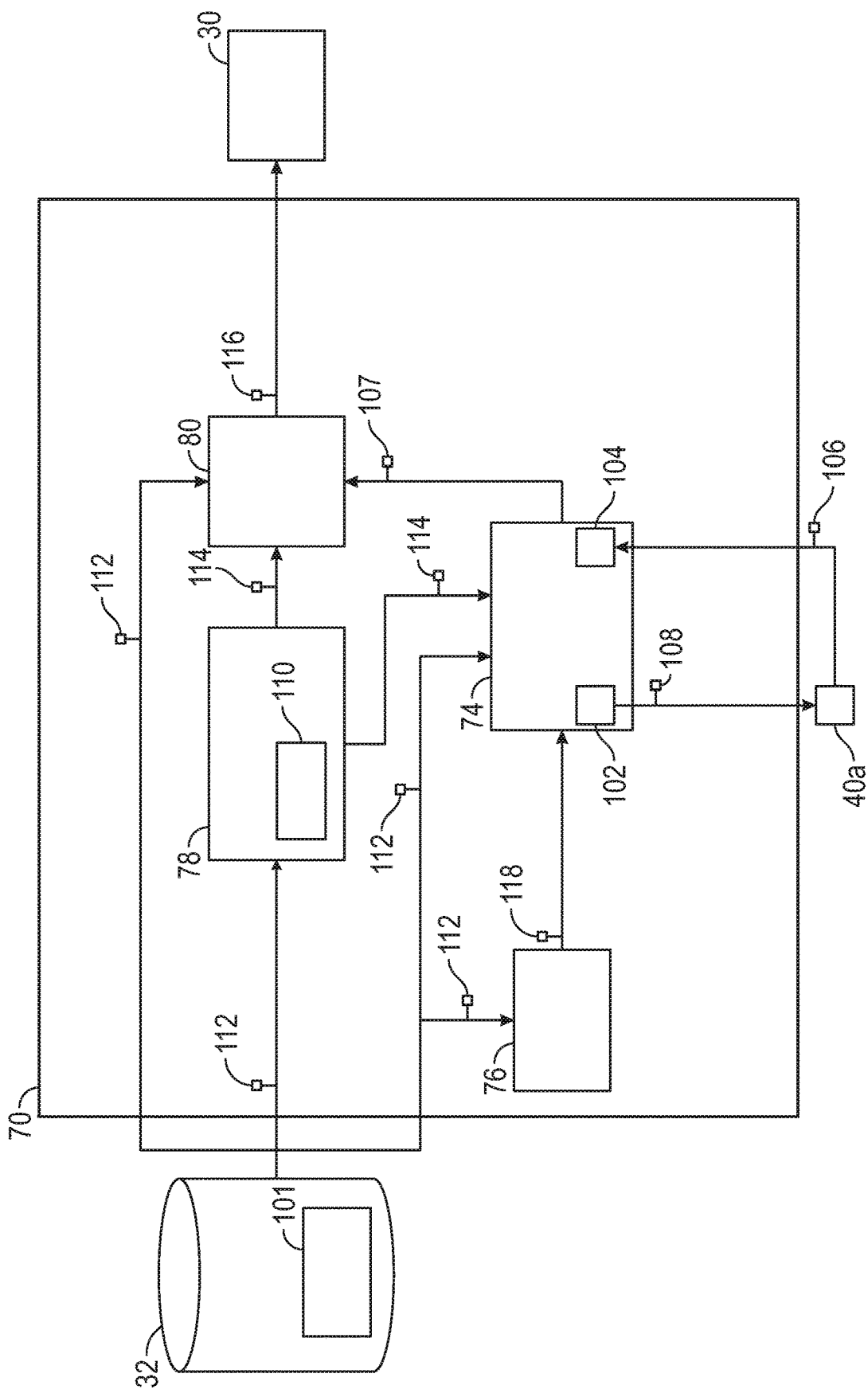

For example, as shown in more detail with regard to FIG. 4 and with continued reference to FIG. 3, the autonomous driving system 70 is configured to retrieve semantic map data 112 from semantic map 101 stored in storage device 32 of the autonomous vehicle 10. Other embodiments are envisaged in which the map data 112 is retrieved from a remote storage device via a wireless network.

Referring to FIG. 5 (a), there is illustrated a semantic map 101 including a two-dimensional base map 122 and at least one semantic layer 120 spatially aligned with the base map 122. That is, the semantic features in the semantic layer 120 are geographically aligned with coordinates of the base map 122. The at least one semantic layer can be in the form of an overlay. The at least one semantic layer 120 includes labels for various road features as described heretofore. Of particular relevance to the present disclosure are labels associated with an intersection including traffic lights. In the illustrated embodiment, the at least one semantic layer includes traffic light labels 1100-1107, labels for normal lanes entering the intersection 1200-1203, labels for normal lanes exiting the intersection 1210-1213, and intersection lanes 1300 defining all possible (allowed per road and driving rules) driving paths connecting the lanes entering the intersection 1200-1203 and the lanes exiting the intersection 1210-1213. Further, included in the at least one semantic layer 120 are anchor points 6000-6003-6003 provided at a defined entrance to the intersection where a normal lane 1200-1203 entering the intersection transitions to intersection lanes 1300. The at least one semantic layer includes connector labels 1220 connecting each anchor point 6000-6003 to relevant traffic lights. In the exemplary embodiment, the at least one semantic layer 120 includes traffic light data 124 (e.g. traffic light identifier and/or location data 124) associated with each intersection lane 1300. Traffic light location data is either taken directly from the traffic light data or is obtained indirectly through the traffic light identifier. In embodiments, the traffic light location data includes x, y and z coordinates as well as pitch, yaw and roll data.

In embodiments, the labels of the at least one semantic layer include at least one of lines, identifiers, location data, etc. In the illustrated embodiment, the labelled normal lanes entering and exiting the intersection 1200-1203, 1210-1213 and the labelled intersection lanes 1300 are labelled to include lane identifiers uniquely identifying the lane in the semantic map 101, directional information (e.g. a direction that a vehicle is allowed to travel when following the lane), location information and lines defining a path of travel for a vehicle following the lane. Some labelled intersection lanes 1300 are such that more than one (e.g. two or three) intersection lanes extend from a single lane entering the intersection 1200-1203 to connect to respective lanes exiting the intersection 1210-1213 defining, respectively, paths that turn left, turn right and/or go straight. In embodiments, the anchor points 6000-6003-6003 are each connected to one or more traffic lights 1100-1107. The anchor points 6000-6003 are only connected to traffic lights that are relevant to traffic flow from that anchor point 6000 and the associated lane entering the intersection 1200-1203. In the illustrated embodiment, the labelled connections 1220 between anchor point 6000 and traffic lights 1105-1106 are made through connecting lines such as straight lines. In one embodiment, the traffic lights 1100-1107 are labelled with traffic light identifiers uniquely identifying each traffic light at the intersection, are labelled with two-dimensional location information relative to the base map 122 and are labelled with height from road surface information. In a further embodiment, orientation information (e.g. pitch, yaw and roll) is included with the traffic light labels 1100-1107 in addition to three-dimensional location data. Further, in some embodiments, the traffic lights are labelled with traffic light type data. Different traffic light types are embodied in a type parameter associated with each traffic light. For example, regular Red/Yellow/Green traffic lights are of a different type to Red/Yellow/Green/Green Arrow Left traffic lights.

In embodiments, each intersection lane 1300 is associated, through association labels, with at least one traffic light 1101-1107 such that different intersection lanes 1300 will be associated with different traffic light data 124 depending upon which traffic lights are relevant for travel along that intersection lane. In one example, the association between traffic light 1101-1107 label and intersection lane 1300 label is through embedding a traffic light identifier or other association label with the intersection lane 1300 label. Alternatively, traffic light location data 124 (in three dimensions) is embedded in the label for the intersection lane 1300.

In various embodiments, the at least one semantic layer 120 is built by a process as follows. Traffic lights are placed in precise x, y and z space by a mix of manual and automated processes and traffic light labels 1100-1107 are constructed at that location in the map that include three-dimensional traffic light location data, traffic light identifier data and optional traffic light orientation data. Each traffic light label 1100-1107 is linked to labelled intersection entry or anchor point 6000 for all lanes 1200-1203 that would use the traffic light(s) for guidance. The intersection in the semantic map 101 includes line strings representing all possible paths of travel that emanate from an anchor point 6000, thereby providing intersection lanes 1300. Traffic light associations in the form of traffic light data 124 are automatically populated into these individual paths of travel or intersection lanes 1300, based on the anchor points 6000-6003 and turn type (e.g. a light with red/yellow/green left arrows is only linked to intersection paths of travel that are assigned a "left" turn type).

Figure 5A:
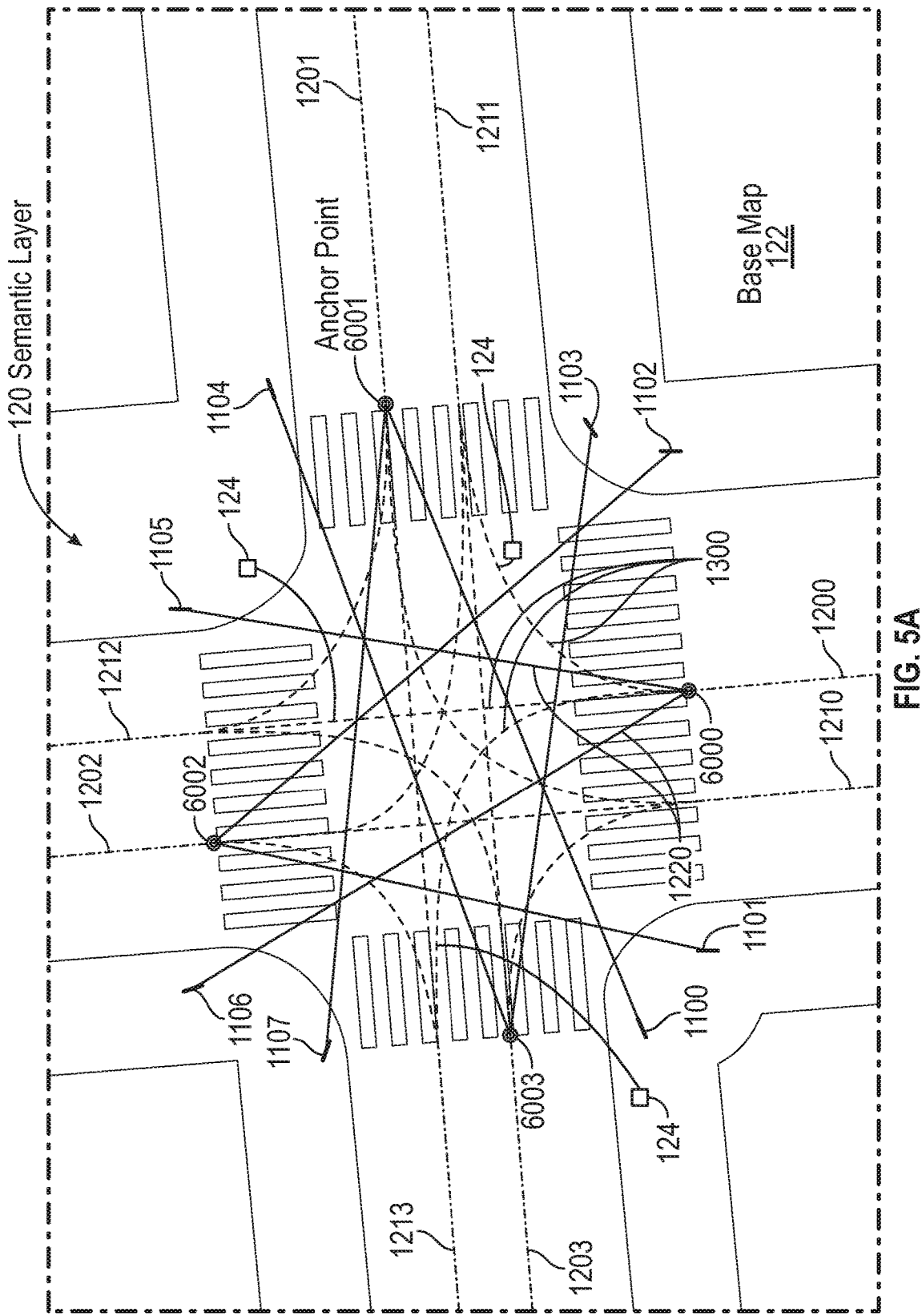
FIG. 5A illustrates a part of a semantic map at an intersection, in accordance with various embodiments.

Returning to FIGS. 3 and 4, whilst continuing to refer to FIG. 5A, use of the semantic map 101 will be further described. Computer vision system 74 is configured to retrieve or otherwise receive semantic map data 112 from the semantic map 101 as the autonomous vehicle 10 approaches an intersection. Semantic map data 112 includes traffic light location data 124 as part of labels for traffic lights 1100-1107 and/or as part of labels for intersection lanes 1300, as described above. The traffic light location data 124 included in the semantic map data 112 allows the computer vision system 74 to direct image processing to a selected part of a field of view of at least one sensing device 40a. In an embodiment, the at least one sensing device 40a includes one or more optical cameras. In various embodiments, computer vision system 74 is configured to generate camera (or other sensing device) control commands 108 based on traffic light location data 124 for controlling at least one of size of field of view, direction of field of view (e.g. panning movements including yaw, tilt and/or roll) and camera zoom. In this way, traffic lights are efficiently identified by the computer vision system 74 based on the traffic light location data 124 included in the semantic map 101 and are visualized by the sensing device 40a to allow traffic light assessment by the computer vision system 74. In other embodiments, the computer vision system 74 does not direct the at least one sensing device and corresponding control commands 108 are not generated. Instead, the computer vision system 74 focuses image processing on a selected part of captured images based on the traffic light location data 124.

In embodiments, the computer vision system 74 retrieves traffic light type data as part of labels for traffic lights 1100-1107. The computer vision system 74 is configured to perform image processing techniques to compare the type of traffic light identified by traffic light type data with the visual data captured by the at least one sensing device 40a to ensure a match, thereby allowing false positives to be reduced. When the visual data does not match the traffic light type, the computer vision system 74 is configured to continue a neighborhood search for the true traffic light of relevance.

In various embodiments, the at least one sensing device 40a visualizes the traffic light based on the control commands 108 and generates sensed data 106, generally in the form of images or video data of at least the traffic light and possibly also neighboring areas. Computer vision system 74 receives the sensed data 106 and includes a traffic light assessment module 104 that processes the sensed data 106 to assess a state of the traffic light (e.g. red for stop, red and amber to commence going, green for go, amber for commence stopping). The traffic light assessment module 104 uses image processing techniques and traffic light assessment algorithms to assess the state of the traffic light, in various embodiments. The traffic light assessment module 104 outputs traffic light state data 107, representing any of the possible traffic light states, to the vehicle control system 80, as will be described further below. In an alternative or additional embodiment to that shown in FIG. 4, the computer vision system 74 is configured to focus on a particular traffic light not necessarily by controlling a field of view of at least one sensing device 40a, but by localizing a portion of images obtained by the at least one sensing device 40a that contains the traffic light. The localized portion of the images is determinable by transforming the real-world coordinates of the traffic light obtained from traffic light location data 124 in the semantic map data 112 to image space. In various embodiments, the transformation of real world coordinates to image space makes use of calibration data of the position of the camera 40a capturing images of the traffic light relative to the vehicle 10, in addition to roll, pitch and yaw of the vehicle 10. The roll, pitch and yaw of the vehicle 10 information is available from the positioning system 76. The calibration data is obtainable from the at least one storage device 32. The traffic light assessment module 104 is able to assess just the traffic light contained in the localized portion to determine the traffic light state data 107.

In an exemplary embodiment, the computer vision system 74 is configured to receive positioning data 118 from positioning system 76. Positioning system 76 is able to determine position of the vehicle 10 in six degrees of freedom based on GPS data and from lidar-based scan matching techniques. At a general level, visual odometry localizes the vehicle 10 relative to a three-dimensional map stored in storage device by comparing features derived from a captured three-dimensional point cloud (e.g. a LiDAR point cloud) with corresponding features in the three-dimensional map. In this way, the vehicle 10 is localized in the three-dimensional map. The positioning system 76 is configured to translate the localized position in the three-dimensional map to a localized position in the two-dimensional semantic map 101 as part of positioning data 118. From this, relevant traffic light location data 124 (and other traffic light data such as traffic light type) is obtainable from semantic map data 112. Based on the vehicle's current localized position in three dimensions, the three-dimensional position of the traffic light obtained from the traffic light location data 124 and extrinsic camera calibration data, location of the traffic light in image space is determined by the computer vision system 74.

In embodiments, the computer vision system 74 is configured to select a region of interest of images obtained by the at least one sensing device 40a corresponding to the traffic light location in image space determined based on traffic light location data 124 as described above. Based on geometric considerations, the computer vision system 74 will select a larger region of interest as the vehicle nears the traffic light. The region of interest will be used in subsequent processing by the traffic light assessment module 104.

In various embodiments, the traffic light assessment module 104 is configured to scale the region of interest to a fixed scale and to run the scaled image data through a neural network configured to identify the state of the traffic light. The traffic light assessment module 104 is, in some embodiments, configured to check that the traffic light type, as known from traffic light type data included in the semantic map data 112, matches the traffic light included in the region of interest. This matching process may be performed using the neural network. In the event of a false positive, the computer vision system 74 is configured to search in the neighborhood of the region of interest or to base the traffic light assessment on subsequent or previous frames of image data that do not return a false positive.

Figure 5B:
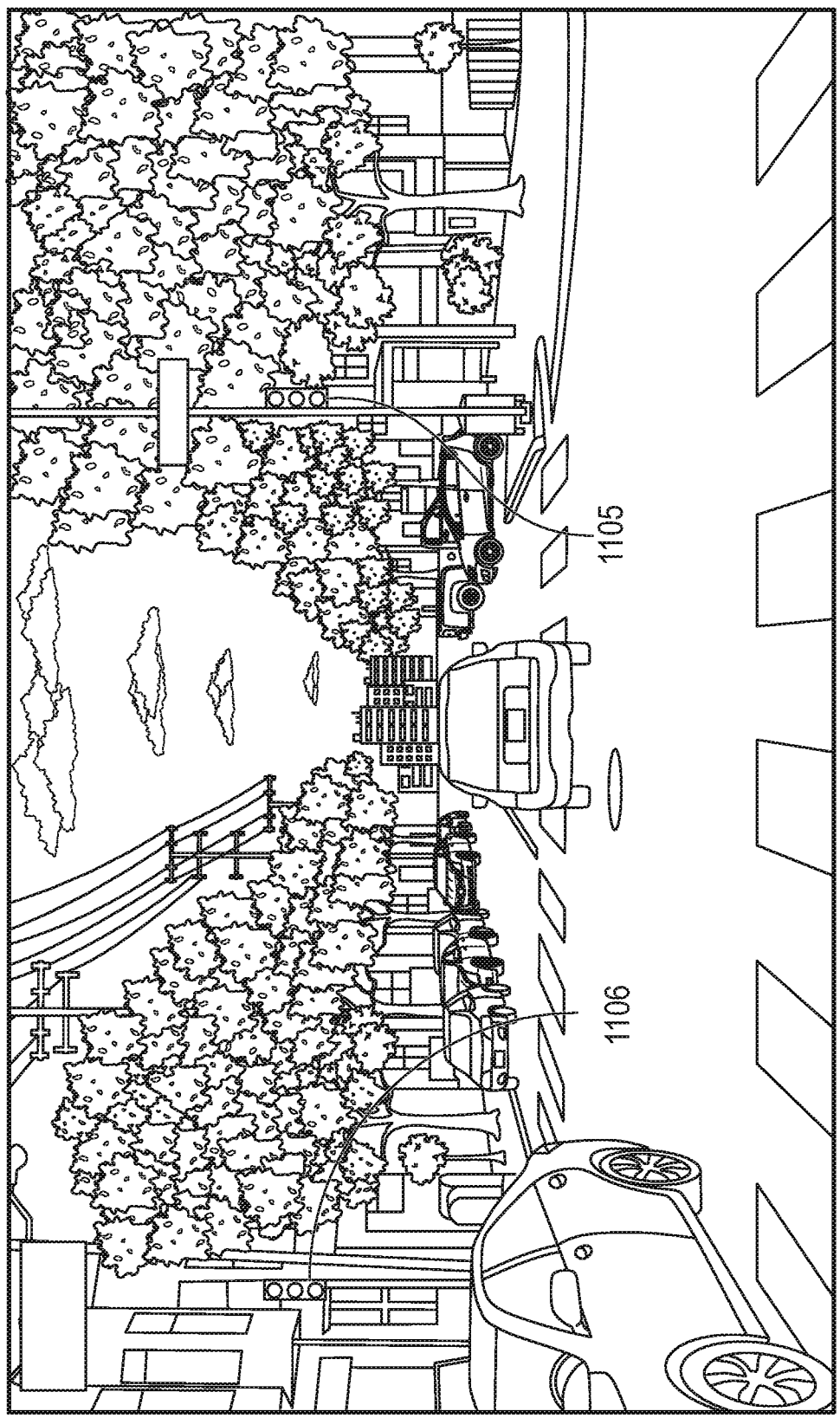
FIG. 5B illustrates a view of an intersection from at least one sensing device.

Referring to FIG. 5B, an example view from a front camera of the autonomous vehicle 10 included in the at least one sensing device 40a is shown. The view is representative of images taken by the front camera of an autonomous vehicle 10 located at anchor point 6000 of FIG. 5A. Two traffic lights labelled as 1105, 1106 in the semantic map 101 of FIG. 5A are visualized by the front camera. In this example, both traffic lights are relevant to going straight ahead and will be associated with the corresponding label for an intersection lane 1300 following a straight-ahead path in the semantic map. The computer vision system 74 is configured to extract traffic light location data 124 included in the semantic map 101 and associated with the straight-ahead intersection lane and to configure a field of view of the front camera and/or to focus on the traffic light in the images obtained by the camera based on the traffic light location data 124, as has been described above. The traffic light location data 124 in the semantic map 101 includes three-dimensional location data. Based on a current position of the autonomous vehicle 10, which is known from position data 118 as described below, the traffic light location data 124 and geometric calculations, the computer vision system 74 is configured to determine, relative to the vehicle 10, the location of the traffic light. In embodiments, the computer vision system 74 is configured to determine a line of sight of the traffic light based on the location of the traffic light relative to the vehicle and/or is configured to determine a location of the traffic light in image space. By using traffic light location data 124 to determine a position in image space of the traffic light, traffic lights can be identified and assessed with enhanced accuracy. In particular, systems and methods described herein allow false positive predictions of traffic lights to be filtered out. For example, a tail light could, in theory, be confused with a tail light, but for the fact that the tail light will not correspond with the location of the traffic light according to the traffic light location data 124, thereby ruling out or avoiding such a false determination. Further, since it is known from traffic light data 124 that there should be a traffic light controlling a local intersection, the system can ensure that the vehicle 10 is controlled in a conservative manner to assume that there is a traffic light, even if one cannot yet be visualized (e.g. because of an obstruction), and proceed through the intersection accordingly. Further, computer processes are made efficient for locating each traffic light at each intersection and for inferring which paths of travel the traffic light represents.

Taking the example of FIG. 5B in greater detail, the autonomous driving system 70 is configured to track the location of the vehicle 10 along a lane segment 1200 entering an intersection. The autonomous driving system 70 is configured to follow the lane segment 1200 according to the route data 114. The autonomous driving system 70 is configured to retrieve the anchor point 6000 from the semantic map data 101 that accords with the route defined by the route data 114. The anchor point 6000 is associated with two traffic lights 1105, 1106 controlling the traffic through the intersection for that lane segment 1200. Based on the traffic lights 1105, 1106 associated with the relevant anchor point 6000, traffic light location data 124 for each traffic light 1105, 1106 can be extracted from the semantic map 101. The computer vision system 74 is configured to capture images of the upcoming intersection and a processor thereof is configured to determine local boxes (or other boundaries) that are a small portion of the captured images localized in image space based on the three dimensional traffic light location data 124 and real space to image space transformation processing. The traffic light assessment module 104 focuses on small portions of the captured images corresponding to the locations of the traffic lights 1105, 1106, thereby reducing chance of false positives and enhancing processing efficiency. The vehicle control system 80 controls the vehicle appropriately according to the traffic light signal.

Based on semantic map data 112, positioning data 118 for the autonomous vehicle 10 relative to the semantic map 101 and route data 114 defining a route to be followed by the autonomous vehicle 10, the computer vision system 74 is able to determine upcoming traffic lights and to commence searching for the relevant traffic light at an appropriate location. That is, route data 114 defines an upcoming route including normal lanes to follow and intersection lanes. The intersection lanes are associated with traffic light data 124 in labels in the semantic map data 112, as has been described above with respect to FIG. 5A. The computer vision system 74 is configured, in various embodiments, to initiate visualizing a traffic light according to processes described above when positioning data 118, route data 114 and semantic map data 112 indicates an approaching, e.g. within a predetermined distance from a current location of the autonomous vehicle 10, traffic light. In embodiments, the route data 114 includes an identifier of an upcoming intersection lane. From the semantic map data 112, traffic light data 124 is associated with the intersection lane, which either includes or is associated with traffic light location data 124. The positioning data 118 allows tracking, e.g. through the positioning system 76, of the autonomous vehicle 10 along the route defined by the route data 114 and allows calculation of a distance from the traffic light to be calculated. When a proximity to the traffic light is sufficiently close (e.g. as determined by a threshold), the computer vision system 74 is configured to visualize or aim to visualize the traffic light, or to begin image processing to find and select the traffic light, associated with the intersection lane and begin assessing the state of the traffic light. In additional or alternative embodiments, the semantic map 101 includes labels in the at least one semantic layer, e.g. associated with the intersection lanes, describing a first line of sight location for the traffic light so that the computer vision system 74 commences visualizing the relevant traffic light at the earliest possible location along the route.

Positioning data 118 is obtained through the positioning system 76 and route data 114 is obtained through the guidance system 78, as will be further described below.

In various embodiments, the positioning system 76 is configured to determine a location of the autonomous vehicle 10 based on sensor inputs. In embodiments, the positioning system 76 is configured to receive global positioning data from a global positioning receiver and sensor imaging from at least one sensor device 40a-40n (e.g. a lidar sensor device) to localize a position of the autonomous vehicle relative to the semantic map 101. The positioning system 76 is configured to receive three-dimensional map data and match features obtained through sensor imaging to features in the three-dimensional map data to accurately locate the autonomous vehicle relative to the three-dimensional map. Since the three-dimensional map and the semantic 101 are calibrated to one another, the positing system 76 is able to generate positioning data 118 representing the location of the vehicle 10 in the semantic map 101.

In various embodiments, guidance system 78 includes a router 110 configured to use semantic map data 112 and run a routing algorithm to plot a route from a start location to an end location. The start location may be a current location of the autonomous vehicle 10. In embodiments, the end location is a destination entered by an occupant of the autonomous vehicle 10 or a destination received from a remote source through a wireless network. In embodiments, the route data 114 comprises a string of lane identifiers including normal lanes and intersection lanes. By following the route defined by the route data 114 along the semantic map 101, labelled data associated with that route is extractable from the semantic map 101 such as traffic light location data 124 associated with labelled intersection lanes 1300.

In embodiments, the vehicle control system 80 utilizes the route data 114 and semantic map data 112 and algorithmically determines upon actuation commands 116 to follow the route defined by the route data 114. Actuator system 30 is responsive to the actuation commands 116 to control vehicle movement as instructed by vehicle control system 80. Vehicle control system 80 receives traffic light state data 107 and determines appropriate vehicle action based thereon. For example, in the event of a green light state defined by the traffic light state data 107, vehicle control system 80 is configured to start going or to continue going through the intersection as prescribed by the route. In the event of a red light state defined by the traffic light state data 107, vehicle control system 80 is configured to stop the vehicle in advance of the traffic light. The vehicle control system 80 is configured to output control commands 116 describing the action to be performed by the autonomous vehicle 10 in response to the traffic light state.

Figure 6:
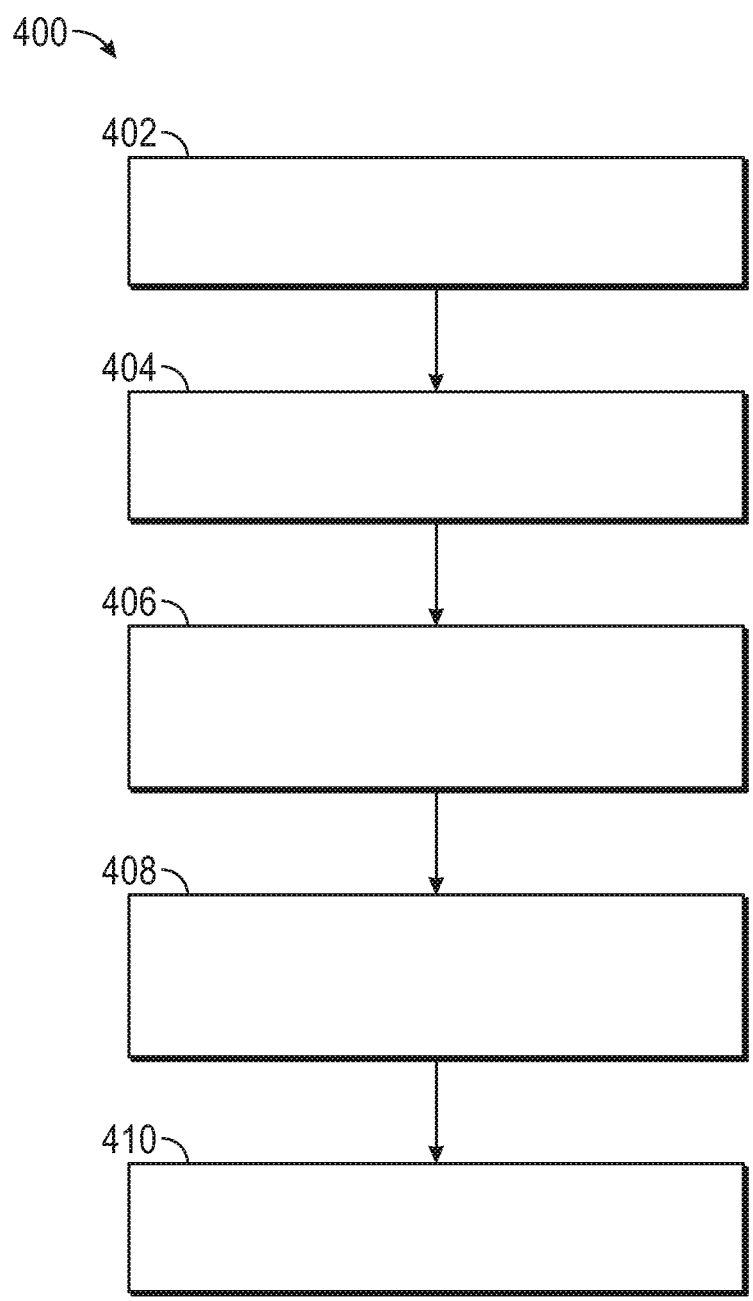
FIG. 6 is a flowchart illustrating a control method for controlling the autonomous vehicle, in accordance with various embodiments.

Referring now to FIG. 6, and with continued reference to FIGS. 1-5, a flowchart illustrates a computer control method 400 that can be performed by the system 100 of FIG. 1 in accordance with the present disclosure. As can be appreciated in light of the disclosure, the order of operation within the method is not limited to the sequential execution as illustrated in FIG. 6, but may be performed in one or more varying orders as applicable and in accordance with the present disclosure. In various embodiments, the method 400 can be scheduled to run based on one or more predetermined events, and/or can run continuously during operation of the autonomous vehicle 10.

In step 402, the autonomous driving system 70 receives semantic map data 112 from the semantic map 101 stored in the at least one storage device 32. The semantic map data 112 includes labelled traffic light data 124 including traffic light location data 124 as part of at least one semantic layer 120 of labelled road features. The semantic map data may also include traffic light type data as described heretofore. The semantic map data 112 is used by various components of the autonomous driving system 70.

In step 404, route data 114 is calculated by a router 110 of guidance system 78 based on input start and destination locations, the semantic map data 112, particularly the base map 122 thereof. The router 110 implements a routing algorithm to calculate an optimal route between the start and destination locations. The route data 114 includes identification of normal lanes and intersection lanes that are to be followed by the autonomous vehicle 10.

In step 406, the autonomous driving system 70, e.g. the positioning system 76 or the computer vision system 74, extracts traffic light location data 124 associated with at least one intersection lane to identify which traffic light(s) is to be viewed and where that traffic light(s) is to be found in real space. Such traffic light location data 124 is included in the semantic map 101 and associated with each intersection lane 1200-1203. The route data 114 identifies the intersection lane 1200-1203 being travelled, thereby allowing the associate traffic light location data 124 to be extracted. In embodiments, positioning system 76 localizes the autonomous vehicle 10 relative to the semantic map 101 and provides corresponding positioning data 118. The computer vision system 74 determines an upcoming intersection lane from the route data 114, the current position defined by the positioning data 118 and the semantic map 101 and extracts traffic light location data 124 associated with the labelled intersection lane in the semantic map 101.

In step 408, the computer vision system 74 visualizes the traffic light(s) specified by the traffic light location data 124 in the semantic map data 112 and assesses the state thereof. The computer vision system 74 produces traffic light state data 107 indicating the assessed state of the traffic light. In some embodiments, the computer vision system 74 controls a field of view and/or zoom or other parameter of at least one sensing device 40*a* (e.g. optical camera) to capture the traffic light based on the traffic light location data 124. To do so, the computer vision system 74 transforms three-dimensional coordinates of the traffic light location data 124 from the semantic map 101 into camera control commands 108 to visualize the traffic light. In order to determine where the optical camera 40*a* is first able to view the traffic light, geometrical calculations are used, in some embodiments, that determine a line of sight from the at least one sensing device 40*a* to the traffic light location defined by the traffic light location data 124. Alternatively, the location at which each traffic light is first able to be viewed (assuming normal visibility conditions) is stored as a label in the semantic map 101, optionally associated with each labelled intersection lane 1300. In another possibility, the location at which each traffic light is first able to be viewed is determined when the autonomous vehicle is within a predetermined distance of the traffic light, which is calculable from the positioning data 118 representing a current position of the autonomous vehicle 10 and the traffic light location data 107. In additional or alternative embodiments, the computer vision system 74 processes a selected portion of captured images that contain the traffic light identified by the traffic light location data 124. The portion of the captured images is, in some embodiments, determined by transforming the traffic light location data 124 into image space to allow the computer vision system 74 to focus on just a part of the images that contain the traffic light. Using vehicle pose information, the relative location of the traffic light 1101-1103, as described in the traffic light location data 124, and the vehicle 10 is determinable. From that relative location and camera calibration information, the location of the traffic light 1101-1103 in image space is determined.

In step 410, the vehicle control system 80 controls driving of the autonomous vehicle 10 to follow the route defined by the route data 114 and to take appropriate action at traffic lights based on the traffic light state data. The vehicle control system 80 produces actuator commands 116 for execution by the actuator system 30.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An autonomous driving system, comprising:
a controller comprising at least one processor and memory, the memory comprising:
a guidance system configured to receive semantic map data and to calculate route data using the semantic map data, via at least one processor;
wherein the semantic map data includes traffic light location data, wherein the semantic map maps an intersection using a plurality of labelled intersection lanes defining paths for traversing the intersection, wherein each labelled intersection lane includes a traffic light label defining traffic light location data, and wherein traffic light labels of at least some of the labelled intersection lanes identify different traffic lights from each other;
a computer vision system configured to view and assess a state of a traffic light based on the traffic light location data, via the at least one processor; and
a vehicle control system configured to control driving of an autonomous vehicle based at least on the route data and the state of the traffic light, via the at least one processor.

2. The autonomous driving system of claim 1, wherein the route data includes at least one labelled intersection lane and the traffic light location data is associated with the at least one labelled intersection lane.

3. The autonomous driving system of claim 1, wherein the semantic map data includes at least one labelled lane entering an intersection and at least first and second labelled lanes exiting the intersection, wherein a first labelled intersection lane defines a path connecting the at least one labelled lane entering the intersection and the first labelled lane exiting the intersection and a second labelled intersection lane defines a path connecting the at least one labeled lane entering the intersection and the second labelled lane exiting the intersection, wherein different traffic light labels are associated with the first and second labelled intersection lanes respectively, identify different traffic lights and define different traffic light location data.

4. The autonomous driving system of claim 1, wherein the semantic map includes labelled lanes entering and exiting an intersection, labelled intersection lanes defining paths connecting labelled lanes entering the intersection and labelled lanes exiting the intersection, labelled anchor points where lanes enter the intersection and labelled traffic lights, wherein each labelled anchor point is linked to at least one labelled traffic light, wherein each labelled intersection lane is associated with a labelled traffic light.

5. The autonomous driving system of claim 4, wherein the semantic map includes at least one of: traffic light identifiers, traffic light type data, intersection lane identifiers, identifiers for lanes entering the intersection and identifiers for lanes exiting the intersection.

6. The autonomous driving system of claim 1, wherein the route data includes lane identifiers identifying lanes to be used along the route and intersection lane identifiers identifying intersection lanes to be used along the route.

7. The autonomous driving system of claim 1, comprising at least one data storage device storing the semantic map in the autonomous vehicle.

8. The autonomous driving system of claim 1, wherein the traffic light location data defines a location of the traffic light in three spatial dimensions including height.

9. The autonomous driving system of claim 1, wherein the computer vision system is configured to control a field of view of at least one sensing device based on the traffic light location data and/or select a portion of imaging data obtained by at least one sensing device that contains the traffic light based on the traffic light data, whereby the computer vision system is configured to assess the state of the traffic light by focusing on the traffic light in the selected portion of imaging data.

10. The autonomous driving system of claim 1, wherein the computer vision system is configured to receive visual data of the traffic light from at least one sensing device and is configured to assess a state of the traffic light including a stop and go state, wherein the vehicle control system is configured to control the autonomous vehicle to commence going, to continue going or to stop before the traffic light depending upon the state of the traffic light.

11. The autonomous driving system of claim 1, the memory comprising a positioning system configured to determine position data representing a current position of the autonomous vehicle, wherein the computer vision system is configured to view the traffic light based on the positioning data and the traffic light location data.

12. A computer implemented method of autonomous driving, the method comprising:
    receiving semantic map data, via at least one processor, wherein the semantic map data includes traffic light location data;
    calculating route data using the semantic map data, via at least one processor;
    viewing, via at least one sensing device, a traffic light and assessing a state of the viewed traffic light, via at least one processor, based on the traffic light location data;
    controlling driving of an autonomous vehicle based at least on the route data and the state of the traffic light, via at least one processor,
    wherein the semantic map includes at least one labelled lane entering an intersection and at least first and second labelled lanes exiting the intersection, wherein a first labelled intersection lane defines a path connecting the at least one labelled lane entering the intersection and the first labelled lane exiting the intersection and a second labelled intersection lane defines a path connecting the at least one labeled lane entering the intersection and the second labelled lane exiting the intersection, wherein different traffic light labels are associated with the first and second labelled intersection lanes respectively, identify different traffic lights and define different traffic light location data.

13. The computer implemented method of claim 12, wherein the traffic light location data defines a location of the traffic light in three spatial dimensions including height.

14. The computer implemented method of claim 12, comprising controlling a field of view of the at least one sensing device based on the traffic light location data and/or selecting a portion of imaging data obtained by the at least one sensing device that contains the traffic light based on the traffic light data, whereby the computer vision system is configured to assess the state of the traffic light by focusing on the traffic light in the selected portion of imaging data.

15. The computer implemented method of claim 12, comprising tracking a location of the autonomous vehicle in the semantic map based on current position data for the autonomous vehicle, extracting traffic light location data from an upcoming labelled intersection lane in the semantic map that is to be followed according to the route data, and configuring the at least one sensing device to view the traffic light and/or concentrate image processing on the traffic light based on the extracted traffic light location data.

16. An autonomous vehicle, comprising:
    a data storage device storing a semantic map, wherein the semantic map includes at least one labelled lane entering an intersection and at least first and second labelled lanes exiting the intersection, wherein a first labelled intersection lane defines a path connecting the at least one labelled lane entering the intersection and the first labelled lane exiting the intersection and a second labelled intersection lane defines a path connecting the at least one labeled lane entering the intersection and the second labelled lane exiting the intersection, wherein different traffic light labels are associated with the first and second labelled intersection lanes respectively, identify different traffic lights and define different traffic light location data;
    a controller comprising at least one processor and memory, the memory comprising:
        a guidance system configured to receive semantic map data from the semantic map and configured to calculate route data using the semantic map data, via the at least one processor;
        wherein the semantic map data includes traffic light location data;
        a computer vision system configured to view and assess a state of a traffic light based on the traffic light location data, via at the least one processor; and
        a vehicle control system configured to control driving of the autonomous vehicle based at least on the route data and the state of the traffic light, via the at least one processor.

17. The autonomous vehicle of claim 16, wherein the memory further comprises a positioning system configured to determine current position data for the autonomous vehicle and configured to track a location of the autonomous vehicle in the semantic map based on the current position data for the autonomous vehicle, the computer vision system configured to extract traffic light location data from an upcoming labelled intersection lane in the semantic map that is to be followed according to the route data, the computer vision system further for configuring the at least one sensing device to view the traffic light and/or for concentrating image processing on the traffic light based on the extracted traffic light location data.

* * * * *